No. 870,884. PATENTED NOV. 12, 1907.
E. F. HOLINGER.
COMPUTING TAPE MEASURE.
APPLICATION FILED AUG. 3, 1907.
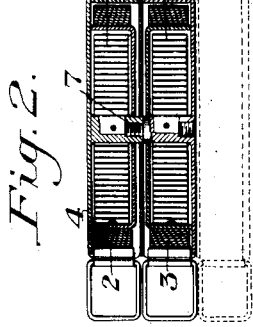
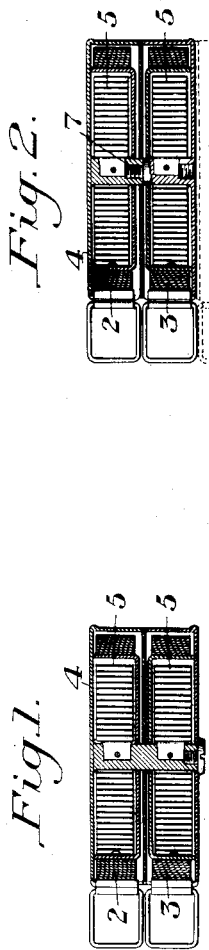
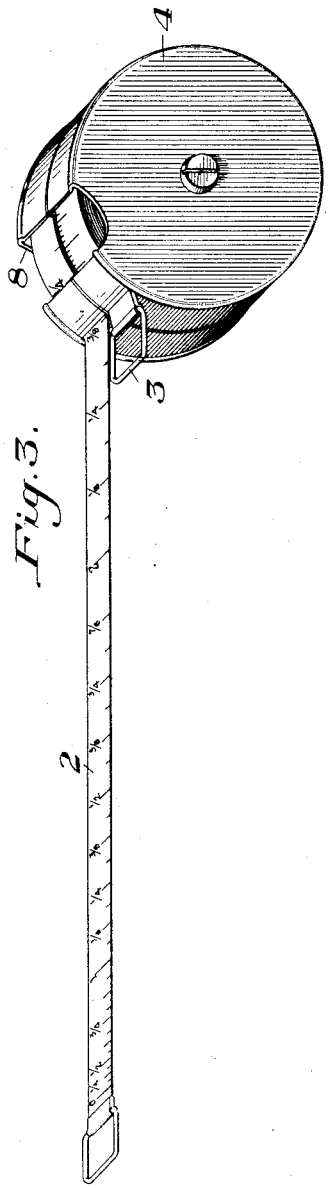
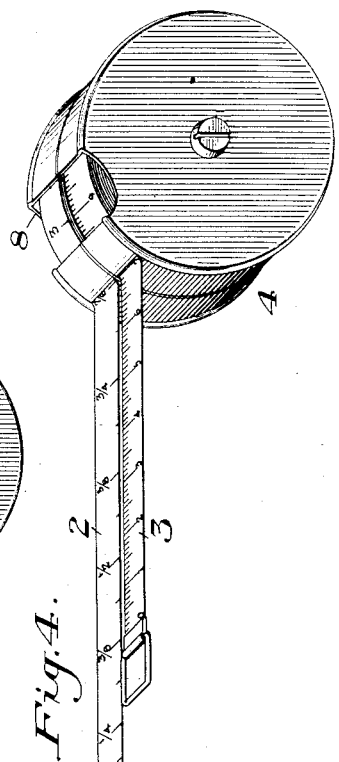
WITNESSES
R. S. Balderson
W. W. Swartz
INVENTOR
E. F. Holinger,
by Bakewell, Byrnes & Parmelee,
his Attys.

UNITED STATES PATENT OFFICE.

EMIL F. HOLINGER, OF McKEESPORT, PENNSYLVANIA.

COMPUTING TAPE-MEASURE.

No. 870,884.

Specification of Letters Patent.

Patented Nov. 12, 1907.

Application filed August 3, 1907. Serial No. 386,961.

*To all whom it may concern:*

Be it known that I, EMIL F. HOLINGER, of McKeesport, in the county of Allegheny and State of Pennsylvania, have invented a new and useful Computing Tape-Measure, of which the following is a full, clear, and exact description, reference being had to the accompanying drawing, in which—

Figures 1 and 2 are sectional views illustrating two different forms of construction embodying my invention; and Figs. 3 and 4 are preespective views illustrating one method or manner of using the measure.

My invention has relation to computing tape measures, and is designed to provide a simple and convenient means for ascertaining weights and measures of various kinds.

The invention is particularly designed for use in determining the weights, or cubic contents, of tubes, bars, rods, and various other shapes, but may be used for a variety of other purposes.

The invention consists in a measure of this character, having two or more tapes arranged side by side in longitudinal relation to each other, and arranged to give direct relative readings in different positions.

The precise nature of the invention will be best understood by reference to the accompanying drawings which will now be described, it being premised, however, that the particular forms of invention shown and described are illustrative merely, the invention being susceptible of various other embodiments.

In the drawings, the numerals 2 and 3 designate two tapes of any suitable material, which are arranged side by side, and are preferably provided with an inclosing case 4 and separate winding-springs 5, which are similar to those employed in the ordinary self-winding tape-measures. Both the tapes, with their winding-springs, may be contained within compartments of a single partitioned casing, as shown in Fig. 1, or the two casings may be formed separately and connected together side by side by means of a screw 7, as shown in Fig. 2.

The measure which is illustrated is particularly designed for ascertaining the weight per foot of tubes and pipes, and rods, and the tape 2 has marked thereon figures which indicate the diameters of the pipes or rods to be measured. The tape 3 bears a series of figures, indicating the weight per foot of pipes and rods of different diameters.

The measure is used in the following manner:—Supposing that it be desired to ascertain the weight per foot of a pipe or tube having an internal diameter of two and three-eighths (2⅜') inches, and an external diameter of two and seven-eighths (2⅞") inches, the tape 2 is drawn out of its casing until the figures 2⅜ appear at the edge of the slot or opening through which the tape is drawn. Both tapes are then drawn out together until the figures 2⅞, representing the external diameter of the pipe or tube, appear on the tape 2 at the edge of the slot, as shown in Fig. 4. The weight per foot is then indicated directly by the figure which appears on the tape 3 directly below the figures 2⅞. Inasmuch as the weight per foot increases with the increasing diameter, the figures on the tape 2 are not arranged in a regular scale, but are at gradually increasing distances apart, in proportion to the ratio of the increase in weight with each increase in diameter. To determine the weight per foot of a solid cylindrical rod, both tapes are drawn out together until the figures representing the diameter of the rod appear on the tape 2 at the edge of the slot, when the weight per foot can be directly read on the tape 3 immediately adjacent to the figures on the tape 2.

It will be seen that in ascertaining the weight of a pipe or tube, as above described, the effect of first drawing out the tape 2 until the figures appear thereon which correspond to the internal diameter, is to subtract from the weight per foot an amount equal to the weight of the metal which would be contained within the core-portion of the pipe or tube if it were solid; whereas, in measuring a solid rod no such subtraction is of course necessary and both tapes are drawn out together to give the proper readings.

While it is obvious that any suitable form of holding device might be employed for holding the tape against the action of the winding springs while making the readings, this may be conveniently done by cutting away the inclosing casing, as indicated at 8, so that either one or both of the tapes may be caught and held by pressure of the thumb or finger. A third tape can be added, as indicated by dotted lines in Fig. 2, having suitable divisions and markings thereon for indicating the cubical contents of the rod or pipe. In fact, there is no limit to the number of tapes which may be combined in this manner, each having appropriate markings for giving the desired data.

From the foregoing, it will be obvious that the invention is capable of wide application, since by providing the tapes with proper markings a variety of data can be ascertained from a given known weight or dimension.

A measure of this character can be readily carried in the pocket, and is capable of quick and convenient use for ascertaining the desired data without employing formulæ or calculations of any kind, all the readings being directly obtained from the figures on the tape.

I claim:—

1. A computing measure consisting of a plurality of tapes each having one free end, arranged side by side, and having markings thereon arranged to be read in connection with each other in different relative positions of the tapes; substantially as described.

2. A computing tape-measure, having a plurality of tapes arranged side by side and having each one free end, at least one of said tapes having markings thereon corresponding to known data, and the other tape or tapes having markings thereon corresponding to the data to be obtained, and arranged to be read in different longitudinal relation to the first-named tape or tapes; substantially as described.

3. A computing measure having at least two independently movable tapes arranged side by side and having each one free end, said tapes having markings thereon arranged to be read in connection with each other in different longitudinal relations of the tapes; substantially as described.

4. A computing measure having at least two independent tapes each of which has one free end, a separate winding spring for each tape, and an inclosing casing for the springs and tapes, having a cut-away portion to expose the tapes to the pressure of the fingers; substantially as described.

5. A computing measure having at least two independently movable tapes each of which has one free end and having markings thereon arranged to be read in connection with each other in different longitudinal relations of the tapes, and a common carrier for all the tapes; substantially as described.

In testimony whereof, I have hereunto set my hand.

EMIL F. HOLINGER.

Witnesses:
  H. M. CORWIN,
  GEO. H. PARMELEE.